United States Patent

Bloemen et al.

[11] Patent Number: 5,925,269
[45] Date of Patent: Jul. 20, 1999

[54] METHOD OF MANUFACTURE OF COROTRON WIRE ASSEMBLY

[75] Inventors: Peter J. M. Bloemen, Cuijk; Jan J. van der Steen, Venray, both of Netherlands

[73] Assignee: Xerox Corporation, Stamford, Conn.

[21] Appl. No.: 08/753,623

[22] Filed: Nov. 27, 1996

[51] Int. Cl.⁶ .................................................. B23K 26/00
[52] U.S. Cl. ...................................................... 219/121.64
[58] Field of Search ........................ 219/121.63, 121.64, 219/121.69, 121.72; 399/172; 174/74 R

[56] References Cited

U.S. PATENT DOCUMENTS

| | | | |
|---|---|---|---|
| 4,914,480 | 4/1990 | Endo | 399/172 |
| 5,245,132 | 9/1993 | Luetzow | 174/74 R |
| 5,541,365 | 7/1996 | Sugiura et al. | 219/121.64 |

FOREIGN PATENT DOCUMENTS

| | | | |
|---|---|---|---|
| 0267141 A2 | 11/1987 | European Pat. Off. | |
| 58-90389 | 5/1983 | Japan | 219/121.64 |
| 59-206187 | 11/1984 | Japan | |
| 2-20677 | 1/1990 | Japan | 219/121.64 |

Primary Examiner—Geoffrey S. Evans

[57] ABSTRACT

A process suitable for making a corona wire assembly for use in an electrostatographic reproduction apparatus involves attachment of a terminal to a corona wire. The process has the steps of positioning said terminal and said corona wire such that a portion of the corona wire is touching the terminal at a contact position; one end of the corona wire is held by a holding device and the unattached end is drawn under a tensioning force from 1 to 3 N across a wire clamp; applying laser energy to the contact position for melting at least part of the terminal in the locality of the contact position; and solidification of the molten part of the terminal for forming a bond with the corona wire. In a preferred aspect, the process includes the additional step laser trimming off of an end-tip of the corona wire.

6 Claims, 2 Drawing Sheets

METHOD OF MANUFACTURE OF COROTRON WIRE ASSEMBLY

FIELD OF THE INVENTION

The present invention relates to a corona wire and terminal assembly component of a corotron wire assembly for use in an electrostatographic printing process, and particularly to a process for making said component.

BACKGROUND OF THE INVENTION

In the well-known electrostatographic reproduction process, a uniform electric charge is provided to an electrostatographic plate. The plate typically comprises a photoconductive insulating material mounted on a conductive backing. A light image of the subject matter to be reproduced is projected onto the charged plate. Discharging occurs where the light image strikes the plate, thereby resulting information of an electrostatic latent image on the plate. The latent image is developed by applying a developer material, such as a toner, which electrostatically clings to the plate in a visual pattern corresponding to the latent image. Thereafter, the developed image is transferred from the plate to a support material, such as paper or a transparency, to which it may be fixed thereby forming a permanent print on the support material.

The charging step, in which a uniform electric charge is provided to the electrostatic plate, is typically achieved by a corona generating device, which is often referred to in the art as a coronode or a corotron. The corona generating device usually comprises a fine wire, hereinafter a corona wire, made of a good conductor, such as tungsten or platinum. Both ends of the wire are provided with a terminal, to facilitate attachment of the wire to end-blocks, which form part of a corotron wire assembly. One of these endblocks is insulated, whilst the other end-block contains a connector, through which high voltage is applied to the corotron wire.

In an electrostatographic printing apparatus the end-blocks are mounted such that, in use, the corona wire is supported in a tensioned manner. The corona wire is positioned in the apparatus such that its extent is spaced evenly from, and within a chargeable distance of, the electrostatographic plate. Often, the corona wire is partially enclosed by a conductive shield which functions such as to enhance the capacity of the corona wire to provide charge to the plate.

The attachment of the ends of the corona wire to the end-blocks has typically been through releasable, mechanical means of attachment which allow for in-field replacement of the corona wire. A potential issue with such methods of attachment is that, because of the need to carefully adjust the length and tensioning of the wire, relatively complex configurations of the end-blocks are required. Such configurations for example, involve screws and springs, which adds to manufacturing complexity and cost. It also adds to the complexity of any infield service replacement of an old corona wire.

The Applicant has now found that these problems can be ameliorated by the use of a corona wire fixably attached, at each end of the wire, to a terminal made of conducting material. The terminal is shaped such as to be releasably attachable to the end-blocks in a straightforward manner, thereby enabling ease of manufacture and service replacement. Simple terminal shapes are preferred from a cost standpoint. A laser 'soldering' method is employed to attach the terminals to the corona wire. Such use of a laser allows for rapid attachment of wire to terminal, and is relatively inexpensive to implement in a manufacturing process on a commercial scale.

In an improvement to the laser 'soldering' approach, the Applicant has also defined a manufacturing process having the steps of positioning of a terminal and a corona wire such that a portion of the corona wire touches the terminal at a contact position; directing a laser beam to the contact position thereby causing a soldering action; and subsequently moving the laser relative to the soldered portion to enable trimming off of the end-tip of the wire.

The Applicant has additionally found that if the wire to terminal soldering step is carried out with the wire held at the same tension as it will be held under 'in use' (i.e. when included as part of the full corotron wire assembly), and that the terminals at either end of the wire are positioned at the same distance along the wire that they will occupy 'in use', that a corona wire/terminal component may be made to such an accurate length dimension, that said wire terminal component can be attached to the corotron wire assembly without requiring any complex tensioning and/or length adjustment means to be present as part of the assembly. Thus the complex and relatively expensive spring or screw tensioning arrangements of prior art assemblies may be dispensed with.

U.S. Pat. No. 3,790,999 electrophotographic apparatus having a corona wire assembly in which the corona wire is secured in a plastic end-block.

U.S. Pat. No. 4,099,219 a corona wire assembly having beads at each end of the wire and end-block assemblies shaped to receive and releasably retain said beads thereby allowing for tensioning of the wire.

U.S. Pat. No. 4,110,811 describes a corona wire assembly in which the corona wire is supported between insulating end-block assemblies. Each assembly is constructed of mating half-sections which jointly define a substantially closed and insulated cavity lined with a conductive insert.

U.S. Pat. No. 4,112,298 describes a corona wire assembly in which the corona wire is supported between insulating end-blocks. Each end-block has a recess which houses a coil spring through which the wire passes coaxially. The wire is attached to a mass which bears against the loaded coil spring to maintain the wire in a tense condition.

U.S. Pat. No. 5,449,906 describes a corona generating assembly having a plurality of corona wires removably mounted to a rigid support frame.

SUMMARY OF THE INVENTION

The present invention relates to a process for attaching a terminal to a corona wire comprising the steps of:

(i) positioning the terminal and the corona wire such that a portion of the corona wire contacts the terminal at a contact position;

(ii) applying laser energy to the contact position thereby melting at least part of the terminal in the locality of the contact position; and (iii) solidification of the molten part of the terminal thereby forming a bond with the corona wire.

In a preferred aspect, in step (i) an end-tip of the corona wire is not touching the terminal and the process includes the additional step of:

(iv) laser trimming off of the end-tip of the wire.

DETAILED DESCRIPTION OF THE INVENTION

Figure 1A:
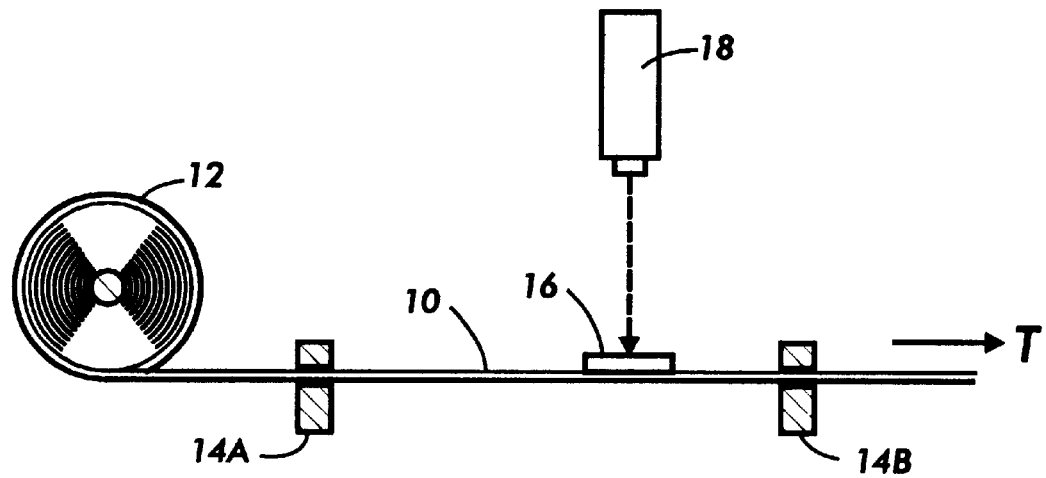
FIGS. 1A and 1B show a side-view of a corona wire to terminal attachment process in accord with the present invention.

The present invention relates to a manufacturing process for attaching a terminal to a corona wire. In a preferred aspect, the steps of the process can be employed to attach terminals to both ends of the corona wire.

The terminal is typically comprised of a metal, preferably stainless steel.

The shape of the terminal is preferably relatively simple, but is shaped such as to enable attachment to the end-blocks of a corotron wire assembly. According to a preferred embodiment, the terminal comprises a washer, that is a disc with a central hole, designed for attachment to end-blocks having fingers onto which the washer can be looped. An exemplary washer-shaped terminal herein is of diameter 4.7 mm, having a hole of diameter 3.2 mm and of thickness 0.2 mm.

The corona wire comprises a conducting metal wire, preferably tungsten or platinum, which may optionally be coated. Suitable coatings include gold, platinum and oxidative coatings. The wire may also be polished. Typically, the corona wire is of thickness from 30 to 100 micrometers, and of length from 250 to 500 mm.

Non-limiting examples of typical wire materials include 50 $\mu$m thickness gold plated wire comprising 97% tungsten/ 3% rhenium; 60 $\mu$m thickness polished wire comprising 97% tungsten/3% rhenium; 60 $\mu$m thickness polished wire comprising tungsten; 90 $\mu$m thickness oxidized wire, material tungsten.

The first step of the process of the present invention involves the positioning of the terminal and the corona ready for joining together. The positioning is such that a portion of the corona wire is touching the terminal at a contact position.

The positioning step can be achieved by any suitable means. Preferably, the wire is held fixed and the terminal is brought up to the wire and into the contact position. The terminal may be moved by any suitable means. A preferred movement means involves a mechanical gripper system, preferably controlled by software.

Preferably, the corona wire is tensioned, for example by fixing a first end of the wire and drawing the second end of the wire tensely across a wire clamp. In one preferred embodiment, the first end of the wire is held by a holding device such as a spool or a bobbin, to which a predefined torque is applied, and the second end of the wire is drawn tensely across a wire clamp such that the wire is kept under the required tension.

The tension force, under which the wire is held, is most preferably equivalent to the tension force which the wire will experience when in the full corotron assembly. This force is typically from 1 to 3 Newtons (N), preferably from 1.5 to 2.5 N, most preferably 2 N.

Preferably, in said positioning step the end-tip, that is the extreme tip at the end of the wire, is not directly touching the terminal. Rather, the end-tip typically overhangs the terminal, and is trimmed off subsequent to the laser bonding of the wire to the terminal. Preferably, said trimming off is also achieved using a laser. Care must however, be taken that the laser energy employed in the trimming off step is not transferred to the wire-terminal bonded portion, such as to cause melting of that portion and hence weakening or break up of the previously formed bond, or any changing of the wire structure through crystallization.

To enable the carrying out of the laser bonding and optional laser trimming off steps the manufacturing assembly line can be arranged such that the terminals and corona wire are conveyed, for example on a moving belt, to the vicinity of the laser source. Said source is arranged to be directable at the required bonding or trim off sites. Alternatively, the said terminals and or wire ends are movably positioned directly under a fixed laser source to carry out the laser welding operation.

A single laser source of variable intensity is preferably used for both the laser bonding and the optional trim off steps. Alternatively, different lasers could be used for the different steps. Methods of laser welding are well documented in the art, including for example, those methods described in EP-A-589,585 and EP-A-015,062.

Typically in the laser welding operation herein, a laser beam is directed at the terminal, but not directly at the end-extent of the corona wire. The terminal is heated by the laser beam and this results in the local melting of the terminal. Once the terminal material has melted, the laser beam is switched off and the molten terminal material solidifies thereby forming a bond to the wire. A cooling means, such as for example, an external heat sink or cooling fan, can be employed to enhance the solidification of the molten material, but in practice this has been found to not always be necessary. Typically, in the laser trimming off operation a less intense laser beam is required.

Typically, the laser employed in the laser welding operation has a pulse power of from 100 to 500 W, preferably from 200 to 400 W. The pulse time is typically between 1 to 10 microseconds, preferably from 2 to 8 microseconds. The pulse energy is typically from 0.2 to 10 Joules, preferably from 0.5 to 3 Joules. In an exemplary laser welding operation in accord with the invention a laser pulse power of 300 W was employed for a pulse time of 5.5 milliseconds, with a pulse energy of 1.65 Joules.

Typically, the laser employed in the optional laser trimming off operation has a pulse power of from 50 to 300 W, preferably from 100 to 200 W. The pulse time is typically between 1 to 10 microseconds, preferably from 2 to 8 microseconds. The pulse energy is typically from 0.1 to 5 Joules, preferably from 0.2 to 1.5 Joules. In an exemplary laser welding operation in accord with the invention a laser pulse power of 150 W was employed for a pulse time of 5.5 milliseconds, with a pulse energy of 0.85 Joules.

An exemplary laser for use herein comprises a Lumonics Luxstar (tradename) laser having a maximum average power of 50 W, a maximum peak power of 5 kW, a pulse width of from 0.5–10 msec and a maximum pulse energy of 25 J.

Figure 1B:
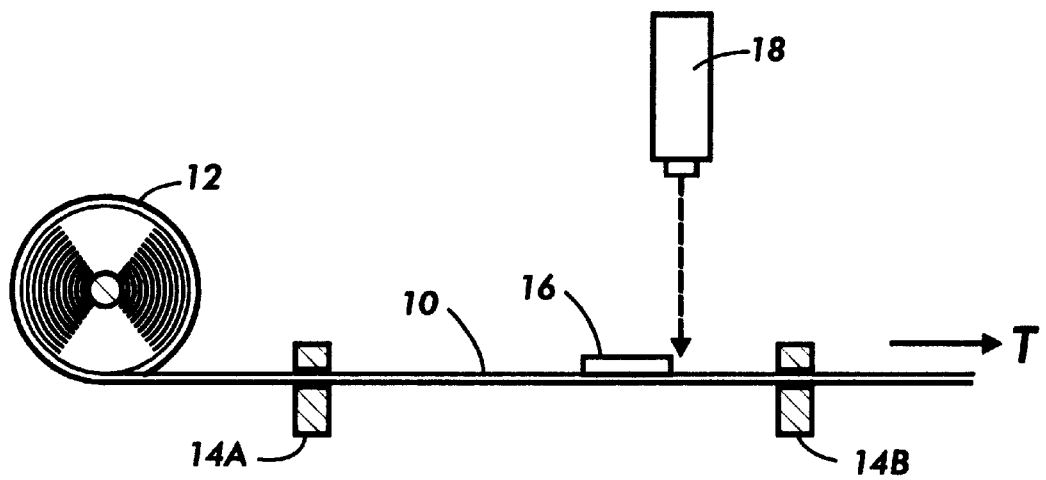

An exemplary process is shown in FIGS. 1A. and 1B. which respectively show laser bonding and laser trim-off steps. A wire (10) supplied from a reel (12) is drawn across wire clamps (14a,14b) by a tensioning force (T). A terminal (16) is positioned against the wire (10). In FIG. 1A. a laser beam is applied to the terminal (16) by a laser source (18) thereby causing local melting of part of the terminal (16) at the terminal-wire contact position. The laser beam is then switched off and the molten part of the terminal solidifies to form a bond. In FIG. 1B. the wire (10) and now bonded terminal (16) have been moved towards the direction of the reel (12) such that when a second laser beam is applied it acts such as to trim-off the overhanging end-portion of the wire.

Figure 2A:
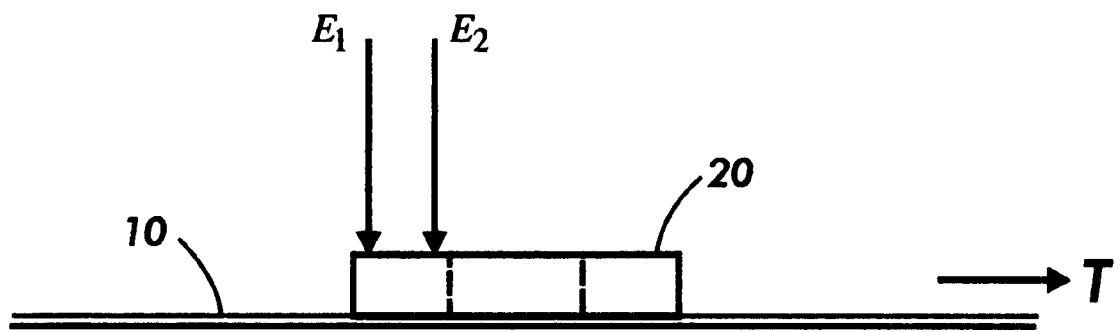
FIGS. 2A and 2B show in, schematic representation a corona wire to terminal attachment process in accord with the present invention.
Figure 2B:
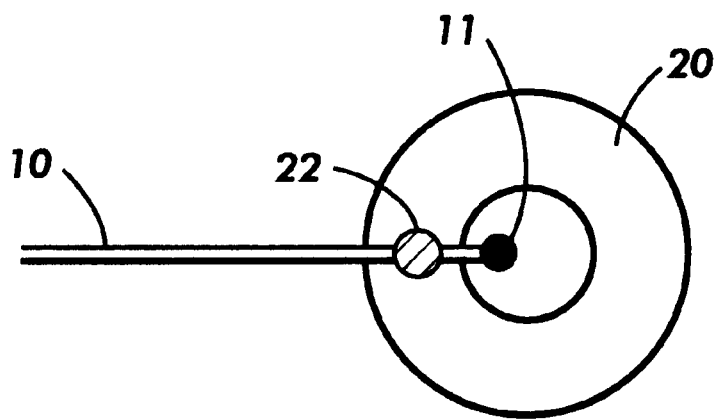

FIGS. 2A and 2B show a schematic representation of an exemplary process herein. A washer-shaped terminal (20) is positioned to contact a wire, which is held in a tensioned state. In a first step, a laser beam ($E_1$) is applied causing local melting of part of the terminal (20) at the terminal-wire contact position. The laser beam is then switched off and the molten part of the terminal solidifies to form a bond (22). A second laser beam ($E_2$) is then applied to trim off the end of the wire which 'overhangs' the hole portion of the washer, to give a trimmed off wire end (11).

It is therefore apparent that there has been provided, in accordance with the present invention, a method of manufacture of a corotron wire assembly that fully satisfies the aspects of the present invention hereinbefore set forth. While this invention has been described in conjunction with a specific embodiment thereof, it shall be evident that many alternatives, modifications and variations will be apparent to those skilled in the art. Accordingly, it is intended that the present invention embrace all such alternatives, modifications and variations that fall within the spirit and broad scope of the appended claims.

We claim:

1. A process for attaching a terminal to a corona wire comprising the steps of:

(i) positioning said terminal and said corona wire such that a portion of the corona wire contacts the terminal at a contact position, an end-tip of the corona wire not touching the terminal;

(ii) applying laser energy to said contact position thereby melting at least part of the terminal in the locality of the contact position;

(iii) solidification of the molten part of the terminal thereby forming a bond with the corona wire; and (iv) laser trimming off of said end-tip of the corona wire.

2. A process according to claim 1, wherein said terminal comprises stainless steel material and said corona wire comprises tungsten.

3. A process for the manufacture of a corotron wire assembly, comprising the steps of:

i) attaching a terminal to both ends of a corona wire (10) by a process in accord with claim 1, and (ii) attaching each terminal to an end-block arrangement.

4. A process for attaching a terminal to a corona wire comprising the steps of:

(i) positioning said terminal and said corona wire such that a portion of the corona wire contacts the terminal at a contact position;

(ii) applying laser energy to said contact position thereby melting at least part of the terminal in a locality of the contact position;

(iii) solidification of the molten part of the terminal thereby forming a bond with the corona wire, and (iv) tensioning said corona wire during said steps (i) to (iii).

5. A process according to any of claim 4, wherein one end of the corona wire is held by a holding device and an unattached end is drawn tensely across a wire clamp.

6. A process according to claim 4, wherein said corona wire is held under a tensioning force of from 1 to 3 N.

* * * * *